United States Patent [19]

Inoue et al.

[11] 4,008,351

[45] Feb. 15, 1977

[54] FILM OR SHEET MATERIAL HAVING ANTIBACTERIAL AND ANTIFUNGAL ACTIVITIES

[75] Inventors: Mayumi Inoue; Masaru Shibata, both of Tokyo; Kenzo Takahashi, Yokohama; Sadao Nakatani, Nishinomiya, all of Japan

[73] Assignees: Sumitomo Bakelite Company, Limited; Mayumi Inoue, both of Tokyo, Japan

[22] Filed: May 12, 1975

[21] Appl. No.: 576,316

[30] Foreign Application Priority Data

May 17, 1974 Japan .............................. 49-54438

[52] U.S. Cl. .................................. 428/411; 424/26; 424/32; 424/114; 428/904; 428/907

[51] Int. Cl.² .................... A01N 17/12; A01N 9/02

[58] Field of Search .......... 428/907, 904, 343, 474, 428/355, 411; 424/16, 26, 32, 114

[56] References Cited

UNITED STATES PATENTS

| | | | |
|---|---|---|---|
| 2,567,910 | 9/1951 | Malone | 428/907 X |
| 2,791,518 | 5/1957 | Stokes et al. | 428/907 X |
| 2,838,426 | 6/1958 | Dahl et al. | 428/907 X |
| 2,880,129 | 3/1959 | Billings | 428/907 X |
| 3,345,341 | 10/1967 | Berry et al. | 428/907 X |
| 3,380,848 | 4/1968 | Horowitz | 428/907 X |
| 3,857,934 | 12/1974 | Bernstein et al. | 428/907 X |

*Primary Examiner*—Harold Ansher
*Attorney, Agent, or Firm*—Karl W. Flocks

[57] ABSTRACT

A film or sheet material having antibacterial and antifungal activities is obtained by mixing a thermoplastic resin with 2-(4'-thiazolyl)-benzimidazole and N-(fluorodichloromethylthio)-phthalimide, and shaping the resulting mixture, or, alternatively, by coating a base film or sheet material on one side or both sides with a coating material containing a mixture of 2-(4'-thiazolyl)-benzimidazole and N-(fluorodichloromethylthio)-phthalimide, a mixture of 2-(4'-thiazolyl)-benzimidazole and N-dimethyl-N'-phenyl-N'-(fluorodichloromethylthio)-sulfamide, or a mixture of N-(fluorodichloromethylthio)-phthalimide and N-dimethyl-N'-phenyl-N'-(fluorodichloromethylthio)-sulfamide.

21 Claims, No Drawings

FILM OR SHEET MATERIAL HAVING ANTIBACTERIAL AND ANTIFUNGAL ACTIVITIES

This invention relates to film or sheet materials having antibacterial and antifungal activities and to wall coverings such as wall paper, ceiling materials, flooring materials, artificial leathers, adhesive tapes, labels, or stickers consisting essentially of said film or sheet materials.

With an improvement in living standard and the diversification of living mode in recent years, dwellings of airtight construction are ever increasing in number. Such dwellings have an annoying problem of damages resulting from the growth of molds and fungi under considerable humidity conditions brought about in the confined room.

In food and related industries, contamination with microorganisms such as molds and bacteria in various steps such as manufacturing, processing, and packaging is a serious problem from the viewpoints of sanitation and food preservation. In this case, the main source of microbial infection is a contaminated environment caused by microorganisms attaching to and growing on walls, ceiling, and floor of the room where manufacturing, processing, and packaging of foods are carried out; such contaminating microorganisms may have good chances to move into the foods.

In the field of medical service, there are strong demands for a bioclean room as a countermeasure against the infection due to environmental cross contamination of the operating room, treatment room, examination room, sick ward, waiting room, dispensary, kitchen, etc. In this case, it is also an important problem to protect walls, ceiling, and floor of the room from microorganisms attaching and growing.

It is the matter of course that pharmaceuticals should be produced in clean environment.

In the field of electronic industry, it is also recognized that manufacture of articles in a microbiologically clean environment is favorable for improving the performance, accuracy, reliability, and yield of the article. It is important also in this case to keep bacteria and fungi which are some of sources of air-borne dust from attaching to and growing on the walls, ceiling and floor.

Further, papers, artificial leathers, adhesive tapes, labels, stickers, and the like support the indoor growth of fungi, thus resulting in not only deterioration of appearance and other properties, but also sanitary troubles.

There are other innumerable examples than those mentioned above and the control of bacteria and fungi is a problem concerned with a wide variety of fields covering from the home life to various industries.

Conventional countermeasures against bacterial and fungal contamination include the following methods which are employed alone or in suitable combinations:
 i. Cleaning of the interior materials by washing and fumigation;
 ii. Application of an anti-bacterial agent and/or antifungal agent to the interior by spraying;
 iii. Application of a coating material incorporated with an antibacterial agent and/or antifungal agent to the interior materials.

The cleaning according to the method (i) must be done regularly at short intervals, requiring much time and labor and, moreover, is practicable only in the area where the use of a detergent and fumigant is allowable.

The spraying according to the method (ii) is a troublesome operation, is prone to result in uneven application of the chemicals, and has a disadvantage of short period of sustained action of applied chemicals.

The method (iii) is a more effective but not a satisfactory countermeasure for the following reasons: applying a coating material is not always an efficient operation; most of the coating compositions involve the danger of volatile solvents; exfoliative tendency of the coating; monotonous appearance; and a relatively short period of sustained antimicrobial effectiveness, which ranges generally from 6 to 12 months.

An object of this invention is to provide a film or sheet material which is harmless and of very low toxicity to the human body, has long lasting antibacterial and antifungal activities, has favorable workability, and is capable of being fabricated in a variety of designs.

Another object of this invention is to provide wall coverings, ceiling materials, floorings, synthetic paper, artificial leathers, tapes, labels, and stickers consisting essentially of the said film or sheet material.

Other objects and advantages of the present invention will become apparent from the following description.

As a result of investigations on the antibacterial and antifungal activities of film or sheet materials obtained by milling and then shaping various compositions comprising a thermoplastic resin and various antibacterial and antifungal additives, the present inventors have found that when a thermoplastic resin is incorporated with an additive comprising a mixture of 2-(4'-thiazolyl)-benzimidazole (hereinafter referred to as chemical A) and N-(fluorodichloromethylthio)-phthalimide (hereinafter referred to as chemical B), there is manifested a synergistic effect on antibacterial and antifungal activities which last for a long period of time (such a film or sheet material is hereinafter referred to as that of the milled type). Further, the present inventors conducted investigations on the antibacterial and antifungal activities of film or sheet materials obtained by coating a base film or sheet material with coating materials containing various bactericides and fungicides. As a result, it was found that when a film or sheet material is coated with a coating material containing an additive comprising a mixture of the chemicals A and B, or a mixture of the chemical A and N-dimethyl-N'-phenyl-N-(fluorodichloromethylthio)-sulfamide (hereinafter referred to as chemical C), or a mixture of the chemicals B and C, the resulting coated film or sheet material exhibits synergistically increased antibacterial and antifungal activities which last for a long period of time (such a film or sheet material is hereinafter referred to as that of the coated type).

The present inventors fabricated wall coverings, ceiling materials, flooring materials, synthetic paper, artificial leathers, tapes, labels, and stickers by use of the present film or sheet material of the milled type or coated type and tested for antibacterial and antifungal activities. As a result, it was found that the said articles exhibit excellent antibacterial and antifungal activities which last for a long period of time.

The term "film or sheet material" as used in the present specification and appended claims means not only an ordinary film or sheet having flat surfaces, but also a corrugated sheet and an embossed film or sheet material.

The thermoplastic resins for use in manufacturing the present film or sheet material of the milled type include homopolymer of vinyl chloride, vinyl chloride-vinyl acetate copolymer, polyethylene, polypropylene, ethylene-propylene copolymer, EPDM (ethylene-propylene-diene methylene linkage copolymer), chlorinated polyethylene, ethylene-vinyl acetate copolymer, styrene-butadiene copolymer, acrylonitrile-styrene-butadiene copolymer, acrylonitrile-styrene copolymer, polymers of methacrylate esters, polyvinylidene chloride, vinyl chloride-vinylidene chloride copolymer, vinylidene chloride-acrylonitrile copolymer, vinylidene chloride-acrylate ester copolymers, polyamides, polyurethanes, polyethylene terephthalate, polybutylene terephthalate, nitrocellulose, ionomers, vinyl chloride-acrylate ester copolymers, and mixtures of these resins. These resins, if necessary, may be incorporated with compounding ingredients such as plasticizers, fillers, crosslinking agents, pigments, foaming agents, stabilizers, lubricants, antistatics, UV absorbers, etc.

Mixing of the thermoplastic resin with the compounding ingredients as well as the chemicals A and B can be carried out by use of customary mixing equipments such as ribbon blender, Henschel mixer, and Banbury mixer. Processing of the resulting mixture may be carried out by use of ordinary film- or sheet-making equipments such as calender, extruder, press, embossing equipment, etc.

The mixing temperature, though not critical, is preferably in the range from 120° to 220° C.

The base films or sheets for use in the present film or sheet material of the coated type include films or sheets made of the aforesaid thermoplastic resins (which may contain the aforesaid compounding ingredients), cellophane, cellulose acetate film, paper, woven fabrics, non-woven fabrics, glass cloth, metal foils, and laminates of these materials.

The thickness of the present film or sheet material, though not critical, is preferably 0.1 to 5 mm. Both the milled type and coated type may be printed.

The coated type is manufactured by coating or impregnating the above-noted base film or sheet with a coating composition containing two of the chemicals A, B, and C, and then drying. The coating composition can be of an organic solvent solution type containing a thermoplastic resin, an emulsion or latex type, or a hot-melt type. The coating composition can be applied by a customary coating technique such as gravure-roll coating, reverse-roll coating, air-knife coating, or dip coating.

In the milled type, a desirable processibility and sufficient antibacterial and antifungal characteristics are developed when the proportion of the chemical B is 25 to 75 % by weight based on the total amount of the chemicals A and B. The total amount of A and B is generally 0.4 % by weight or larger, preferably 0.4 to 2.0 % by weight based on the thermoplastic resin. If the total amount of A and B is less than 0.4 % by weight, desirable antibacterial and antifungal activities are not attained, while if the total amount exceeds 2.0 % by weight, not only the thermal stability of the thermoplastic resin tends to decrease, but also the excess of expensive chemicals results in an increase in material cost.

In manufacturing the coated type, when the chemicals A and B are used, the proportion of B is 25 to 75 % by weight based on total amount of the chemicals A and B and the total amount of the chemicals A and B is 0.4 % or higher, preferably 0.4 to 2.0 %, by weight based on the total solids of the coating composition; when the chemicals A and C are used, the proportion of the chemical C is 25 to 75 % by weight based on the total amount of the chemicals A and C, and the total amount of the chemicals A and C is preferably 0.2 to 2.0 % by weight based on the total solids of the coating composition in order to obtain the desired properties; and when the chemicals B and C are used, the proportion of the chemical C is 25 to 75 % by weight based on the total amount of the chemicals B and C in order to develop the desired properties, and the total amount of the chemicals B and C is preferably 0.4 to 2.0 % by weight based on the total solids of the coating composition. The above-noted preferred ranges of the proportion between the chemicals and of the amount of chemicals to be incorporated into the coating composition are set for the same reasons as in the milled type.

The present sheet or film material of the milled type, after having been decorated by printing or embossing, is fixed in place by use of nails or adhesives to serve as ceiling overlay, wall covering, or flooring material. The adhesive in this case may be any of those suitable for the thermoplastic resin used. The adhesive may also be applied previously to the film or sheet material and covered with a releasing paper which is peeled off when the material is fixed in place. In the same way, stickers and adhesive tapes are pretreated and used.

The artificial leather made of the present material is supplied preferably in the form of foamed material and can be used as an upholstery for suit cases, chairs, sofas, etc.

The present material of the coated type can be decorated by printing or by use of a printed base material and used similarly to the milled type.

The invention is illustrated below with reference to Examples but the invention is not limited to the Examples.

EXAMPLE 1

| | Parts by Weight |
|---|---|
| Vinyl chloride resin (average polymerization degree, 800) | 100 |
| Reinforcing agent (MBS) | 5 |
| Plasticizer | 2.5 |
| Stabilizer (tin octoate) | 0.8 |
| Lubricant | 0.5 |
| Chemical A | 0 – 0.9 |
| Chemical B | 0 – 0.9 |

The above ingredients were thoroughly mixed in a blender, then milled by means of a mixing roll-mill at 160° C for 5 minutes and made into a rolled sheet. The rolled sheet was compression-molded at 170° C and 30 kg/cm$^2$ to obtain a press sheet, 0.15 mm in thickness. Test specimens, each 95 × 75 mm in size, cut out of the press sheet were sterilized by immersion in 70 — % by weight ethyl alcohol solution and freed from the ethyl alcohol by thoroughly drying in a sterile Petri dish. One of the two specimens thus treated was tested for antifungal activity on a plate of potato dextrose agar medium (referred to hereinafter as P medium), while the other was tested for antibacterial activity on a plate of bouillon agar medium (referred to hereinafter as N medium). The antifungal activity was tested against the following fungi:

| | |
|---|---|
| *Aspergillus niger* | ATCC 9642 |
| *Aspergillus flavus* | ATCC 9643 |
| *Chaetomium globosum* | ATCC 6025 |
| *Penicillium citrinum* | ATCC 9849 |

-continued

| | |
|---|---|
| Rhizopus nigricans | SN 32 |
| Cladosporium herbarum | IAM F517 |
| Pullularia pullulans | IAM F24 |

The antibacterial activity was tested against the following bacteria:

| | |
|---|---|
| Pseudomonoas aeruginosa | ATCC 8060 |
| Bacillus subtilis | NRRL B558 |
| Escherichia coli | OUT |
| Proteus vulgaris | IID |
| Staphylococcus aureus | FDA 209p |

Spores are always used in the case of fungi tests. Fresh spores were inoculated on a surface of a slant of a potato dextrose agar and incubated at 25°–27° C for 3–6 weeks to form spores completely. To 10 ml of each of the thus formed slant cultures was aseptically added a non-toxic wetting agent, for example, a 0.005 % by weight aqueous dioctyl sodium sulfosuccinate solution which had been sterilized at 120° C for 15 min. in an autoclave, and then sufficiently shaken to suspend spores from the fruiting body in the liquid. The thus obtained seven fungi spore suspensions were combined together, and the resulting mixture was uniformly sprayed on a plate culture and a test specimen thereon in a Petri dish, which was then covered and maintained at 30° ± 1° C and 95 ± 5 % R.H. for 28–40 days in a microbial contamination-free vessel to grow hypha.

In the case of the bacteria test, strains of the 5 bacteria were separately pre-cultured in a bouillon medium for 24–48 hrs, and the thus cultured product was diluted with a 0.005 % by weight aqueous dioctyl sodium sulfosuccinate solution to about 10 times. The thus obtained suspensions of the strains of the 5 bacteria were combined together, and the resulting mixture was then cultured in the same manner as in the case of the fungi test for 28–40 days.

The degree of growth of the microorganisms on the surface of the test specimen was determined by the following method: A small piece of a sterilized thin paper having a size of 50 × 60 mm was aseptically attached to the center of the test specimen, and kept for 15 min. The small piece of paper was aseptically transferred in 10 ml of sterilized water and well stirred. The resulting liquid was diluted with sterilized water by the dilution method to from 10 times to 10,000,000 times, and 1 ml of each of the diluted liquids was placed in a sterilized Petri dish, to which was then added 10 ml of a sterilized agar cooled to 55° C, and the agar was then gelated while sufficiently mixing the bacterial liquid with the agar, after which the Petri dish was subjected to cultivation at 30° C for 24–48 hrs. The number of colonies on the plate medium was determined by counting the colonies, and multiplied by the dilution time to determine the number of the microorganisms remaining alive on the surface of the test specimen per the area of the small piece of paper. The results of culture test for 28 days and for 40 days were as shown in Table 1 and Table 2, respectively.

Table 1

| Test No. | Chemicals added (% by weight) | | Number of microorganisms alive on the small piece of paper | |
|---|---|---|---|---|
| | Chemical A | Chemical B | P medium | N medium |
| 1 | 0 | 0 | 500 | 600 |
| 2 | 0.2 | 0 | 380 | 320 |
| 3 | 0.4 | 0 | 0 | 80 |
| 4 | 0.7 | 0 | 0 | 10 |
| 5 | 0.2 | 0.2 | 2 | 0 |
| 6 | 0.3 | 0.3 | 0 | 0 |
| 7 | 0.4 | 0.4 | 0 | 0 |
| 8 | 0 | 0.2 | 180 | 100 |
| 9 | 0 | 0.4 | 20 | 10 |
| 10 | 0 | 0.7 | 4 | 0 |

Table 2

| Test No. | Chemicals added (% by weight) | | Number of microorganisms alive on the small piece of paper | |
|---|---|---|---|---|
| | Chemical A | Chemical B | P medium | N medium |
| 1 | 0 | 0 | $5 \times 10^5$ | $7 \times 10^4$ |
| 2 | 0.2 | 0 | $6 \times 10^2$ | $3 \times 10^4$ |
| 3 | 0.4 | 0 | 0 | $4 \times 10^3$ |
| 4 | 0.7 | 0 | 0 | $8 \times 10^3$ |
| 5 | 0.2 | 0.2 | 0 | $2 \times 10^2$ |
| 6 | 0.3 | 0.3 | 0 | 0 |
| 7 | 0.4 | 0.4 | 0 | 0 |
| 8 | 0 | 0.2 | $5 \times 10^3$ | $3 \times 10^3$ |
| 9 | 0 | 0.4 | $7 \times 10^2$ | $2 \times 10^2$ |
| 10 | 0 | 0.7 | 10 | 0 |

It was found that $10^9$–$10^{12}$ microorganisms were grown per cm² of the medium where it had not been covered with the test specimen. As is apparent from Table 1 and Table 2, when 0.3 % by weight or more of a mixture of the chemicals A and B was contained in the test specimen, neither fungi nor bacteria were detected and that the mixture is effective in smaller amount than that of each chemical used alone. This seems to be due to a synergistic effect. The activity of the test specimen of the film incorporated with the mixture showed entirely no change when incubation was effected at 30° C for more than 3 months, and the test is now still in progress.

EXAMPLE 2

A flexible polyvinyl chloride sheet containing 30 phr of a plasticizer was coated by means of a bar coater with a coating composition comprising an acrylic resin emulsion (a methyl acrylate-vinyl chloride copolymer emulsion having a solid content of 40 % by weight) in which a mixture of the chemicals A and B, a mixture of the chemicals A and C, a mixture of the chemicals B and C, or, as a Comparative Example, the chemical A alone was dispersed, to form a coating film, 10 μ in thickness. The resulting coated sheet material was subjected to the fungi culture test and bacteria culture test in the same manner as in Example 1. The test results obtained after culturing for 28 days and 40 days were as shown in Table 3 and Table 4, respectively.

Table 3

| Test No. | Chemicals added (% by weight) | | | Number of microorganisms alive on the small piece of paper | |
|---|---|---|---|---|---|
| | Chemical A | Chemical B | Chemical C | P medium | N medium |
| 1 | 0 | 0 | 0 | 4,300 | 5,700 |
| 2 | 0.2 | 0.2 | 0 | 10 | 200 |

Table 3-continued

| Test No. | Chemicals added (% by weight) Chemical A | Chemical B | Chemical C | Number of microorganisms alive on the small piece of paper P medium | N medium |
|---|---|---|---|---|---|
| 3 | 0.4 | 0.4 | 0 | 0 | 0 |
| 4 | 0.2 | 0 | 0.2 | 0 | 0 |
| 5 | 0.4 | 0 | 0.4 | 0 | 0 |
| 6 | 0 | 0.2 | 0.2 | 7 | 0 |
| 7 | 0 | 0.4 | 0.4 | 0 | 0 |
| 8 | 0.2 | 0 | 0 | 70 | 620 |
| 9 | 0.7 | 0 | 0 | 0 | 15 |

Table 4

| Test No. | Chemicals added (% by weight) Chemical A | Chemical B | Chemical C | Number of microorganisms alive on the small piece of paper P medium | N medium |
|---|---|---|---|---|---|
| 1 | 0 | 0 | 0 | $4 \times 10^4$ | $6 \times 10^4$ |
| 2 | 0.2 | 0.2 | 0 | 0 | $3 \times 10^2$ |
| 3 | 0.4 | 0.4 | 0 | 0 | 0 |
| 4 | 0.2 | 0 | 0.2 | 0 | 0 |
| 5 | 0.4 | 0 | 0.4 | 0 | 0 |
| 6 | 0 | 0.2 | 0.2 | 0 | 0 |
| 7 | 0 | 0.4 | 0.4 | 0 | 0 |
| 8 | 0.2 | 0 | 0 | $1 \times 10^2$ | $7 \times 10^3$ |
| 9 | 0.7 | 0 | 0 | 0 | $1 \times 10^3$ |

It was found in the case of the coated type that perfect antibacterial and antifungal effects were shown by the addition of each 0.4 % by weight of the chemical A and chemical B, or each 0.4 % by weight of the chemical B and chemical C, or each 0.2 % by weight of the chemical A and chemical C. The combination of the chemicals A and C is deemed to be the most suitable for use in the present material of the coated type, because not only the combination is effective at a low concentration, but also both chemicals are non-volatile and do not degenerate on exposure to light or air. As is apparent from Table 3 and Table 4, the chemicals A, B, and C become more powerful by synergistic effect when used in combinations of two of them. The combination, therefore, is more economical in actual use.

EXAMPLE 3

For the purpose of a practical test, a polybutyl acrylate adhesive was applied to the backs of the present film materials of the milled type and the coated type by means of a bar coater, and the film materials were then adhered to the walls and, ceilings of the laboratory in which the present inventors were working and of the lavatory. At the same time, as Comparative Example, a reference film material of the milled type containing no active chemical was also adhered. After 1 month, the microorganisms on the film surface were transferred to a small piece of paper and incubated in the same manner as in Example 1. The results obtained by measuring the number of microorganisms were as shown in Table 5.

Table 5

| Test No. | Type | Chemicals added (% by weight) Chemical A | Chemical B | Chemical C | Number of microorganisms on the small piece of paper Wall and ceiling of laboratory | Wall and ceiling of lavatory |
|---|---|---|---|---|---|---|
| 1 | Milled type | 0 | 0 | 0 | 30 ~ 45 | 80 ~ 100 |
| 2 | ″ | 0.4 | 0.4 | 0 | 0 | 0 |
| 3 | Coated type | 0.4 | 0.4 | 0 | 0 | 0 |
| 4 | ″ | 0.3 | 0 | 0.3 | 0 | 0 |
| 5 | ″ | 0 | 0.4 | 0.4 | 0 | 0 |

As is apparent from Table 5, the present film material has an excellent antibacterial-antifungal activity and can be used as an antibacterial-antifungal wall covering or ceiling material.

EXAMPLE 4

Molded floor tiles of the same resin as in Example 1, 1 mm in thickness, made of the present material of the milled type were adhered with a polybutyl acrylate adhesive to the floor of the laboratory in which the present inventors were working. At the same time, as Comparative Example, molded floor tiles, 1 mm in thickness, made of a material containing no antibacterial-antifungal chemical were also adhered to the floor. After one month, the microorganisms were transfered to a small piece of paper in the same manner as in Example 1 and incubated at 30° C for 48 hours. The results obtained by measuring the number of microorganisms alive on the floor were as shown in Table 6.

Table 6

| Test No. | Type | Chemicals added (% by weight) Chemical A | Chemical B | Microorganisms alive on the small piece of paper (number) |
|---|---|---|---|---|
| 1 | Milled type | 0 | 0 | > 1,000 |

Table 6-continued

| Test No. | Type | Chemicals added (% by weight) Chemical A | Chemical B | Microorganisms alive on the small piece of paper (number) |
| --- | --- | --- | --- | --- |
| 2 | " | 0.4 | 0.4 | 20 |

As is seen from Table 6, it is apparent that the molded floor tile made of the present material has an excellent antibacterial-antifungal activity.

EXAMPLE 5

|  | Parts by weight |
| --- | --- |
| Vinyl chloride resin (average polymerization degree; 1,000) | 100 |
| Plasticizer | 80 |
| Filler (clay type) | 30 |
| Pigment (carbon black type) | 3 |
| Stabilizer (tin octoate type) | 0.8 |
| Lubricant | 0.5 |
| Blowing agent (diazo type) | 2.0 |
| Chemical A | 0.9 |
| Chemical B | 0.9 |

The above ingredients were thoroughly mixed in a blender, then milled by means of a mixing roll-mill at 140° C for 5 minutes, and made into a rolled sheet. The rolled sheet was heated at 170° C to obtain a foamed sheet resembling a sheet of leather. The said sheet and a reference sheet of the same formulation except for the chemicals A and B were kept standing at 30° C and 90 % RH for 3 months. Pronounced growth of fungi was observed on the reference sheet containing neither the chemical A nor the chemical B, whereas absolutely no growth of fungi was found on the leather-like sheeting containing the chemicals A and B, demonstrating an excellent antibacterial-antifungal property of the latter leather-like sheet.

EXAMPLE 6

A sheet material of the milled type obtained in Example 1 or the coated type obtained in Example 2 was printed by means of a gravure printing machine, and to the back of the printed sheet material was applied a polybutyl acrylate adhesive to a thickness of 30 μ by means of an applicator to obtain a sticker. This sticker can be used also as an adhesive tape by slitting it to a proper width. The said sticker and a reference sticker prepared by applying an adhesive to a sheet which had been neither incorporated nor coated with abtimicrobial chemicals were allowed to stand in the air (30° C, 90 % RH) for 3 months. The microorganisms on the sticker were then transferred to a small piece of paper in the same manner as in Example 1 and incubated at 30° c for 40 hours. The results obtained by measuring the number of microorganisms on the sticker were as shown in Table 7.

Table 7

| Test No. | Type | Chemicals added (% by weight) Chemical A | Chemical B | Chemical C | Microorganisms alive on small piece of paper (number) |
| --- | --- | --- | --- | --- | --- |
| 1 | Milled type | 0 | 0 | 0 | 200 |
| 2 | " | 0.4 | 0.4 | 0 | 0 |
| 3 | Coated type | 0 | 0.4 | 0.4 | 0 |
| 4 | " | 0.3 | 0 | 0.3 | 0 |

As is seen from Table 7, it was found that the sticker according to this invention has an excellent antibacterial-antifungal activity. The sticker is also useful as an adhesive tape with an antibacterial-antifungal property when slitted into narrow strips.

What is claimed is:

1. A film or sheet material with antibacterial and antifungal activities obtained by milling a mixture comprising a thermoplastic resin, and an amount sufficient to provide said plastic with antibacterial and antifungal properties of a mixture of 2-(4'-thiazolyl)-benzimidazole and N-(fluorodichloromethylthio)-phthalimide, and then shaping the milled mixture.

2. A film or sheet material with antibacterial and antifungal activities obtained by coating a base film or sheet material on one side or both sides with a coating material containing an amount sufficient to provide said film or sheet with antibacterial and antifungal properties of a mixture of 2-(4'-thiazolyl)-benzimidazole and N-(fluorodichloromethylthio)-phthalimide, or a mixture of 2-(4'-thiazolyl)-benzimidazole and N-dimethyl-N'-phenyl-N'-(fluorodichloromethylthio)-sulfamide, or a mixture of N-(fluorodichloromethylthio)-phthalimide and N-dimethyl-N'-phenyl-N'-(fluorodichloromethylthio)-sulfamide.

3. A wall covering consisting essentially of the film or sheet material with antibacterial and antifungal activities according to claim 1.

4. A ceiling material consisting essentially of the film or sheet material with antibacterial and antifungal activities according to claim 1.

5. A flooring material consisting essentially of the film or sheet material with antibacterial and antifungal activities according to claim 1.

6. An artificial leather consisting essentially of the film or sheet material with antibacterial and antifungal activities according to claim 1.

7. An adhesive or nonadhesive tape consisting essentially of the film or sheet material with antibacterial and antifungal activities according to claim 1.

8. A label or sticker consisting essentially of the film or sheet material with antibacterial and antifungal activities according to claim 1.

9. A film or sheet material according to claim 1, wherein the weight ratio between the 2-(4'-thiazolyl)-benzimidazole and the N-(fluorodichloromethylthio)-phthalimide is in the range from 25 : 75 to 75 : 25.

10. A film or sheet material according to claim 9, wherein the total amount of the 2-(4'-thiazolyl)-benzimidazole and the N-(fluorodichloromethylthio)-phthalimide is 0.4 % to 2% by weight based on the thermoplastic resin.

11. A film or sheet material according to claim 1, wherein the thermoplastic resin is selected from the group consisting of vinyl chloride homopolymer, vinyl chloride-vinyl acetate copolymer, polyethylene, polypropylene, ethylene-propylene copolymer, EPDM, chlorinated polyethylene, ethylene-vinyl acetate copolymer, styrene-butadiene copolymer, acrylonitrile-styrene-butadiene copolymer, acrylonitrile-styrene copolymer, methacrylate ester polymers, polyvinylidene chloride, vinyl chloride-vinylidene chloride copolymer, vinylidene chloride-acrylonitrile copolymer, vinylidene chloride-acrylate ester copolymers, polyamides, polyurethanes, polyethylene terephthalate, polybutylene terephthalate, nitrocellulose, ionomers, vinyl chloride-acrylate ester copolymers, and mixtures of two or more of these polymers.

12. A film or sheet material according to claim 1, wherein the milling is carried out at 120° to 220° C.

13. A film or sheet material according to claim 2, wherein the base film or sheet material is a film or sheeting of a thermoplastic resin, cellulose acetate film, paper, woven fabric, nonwoven fabric, glass cloth, or a metal foil.

14. A film or sheet material according to claim 2, wherein total amount of the 2-(4'-thiazolyl)-benzimidazole and the N-(fluorodichloromethylthio)-phthalimide is 0.4 to 2.0 % by weight, or the total amount of the 2-(4'-thiazolyl)-benzimidazole and the N-dimethyl-N'-phenyl-N'-(fluorodichloromethylthio)-sulfamide is 0.2 to 2.0 % by weight, or the total amount of the N-(fluorodichloromethylthio)-benzimidazole and the N-dimethyl-N'-phenyl-N'-(fluorodichloromethylthio)-sulfamide is 0.4 to 2.0 % by weight based on the total solids contained in the coating material.

15. A film or sheet material according to claim 14, wherein the weight ratio between the 2-(4'-thiazolyl)-benzimidazole and the N-(fluorodichloromethylthio)-phthalimide, the weight ratio between the 2-(4'-thiazolyl)-benzimidazole and the N-dimethyl-N'-phenyl-N'-(fluorodichloromethylthio)-sulfamide, or the weight ratio between the N-(fluorodichloromethylthio)-benzimidazole and the N-dimethyl-N'-phenyl-N'-(fluorodichloromethylthio)-sulfamide is in the range from 25 : 75 to 75 : 25.

16. A wall covering consisting essentially of the film or sheet material with antibacterial and antifungal activities according to claim 2.

17. A ceiling material consisting essentially of the film or sheet material with antibacterial and antifungal activities according to claim 2.

18. A flooring material consisting essentially of the film or sheet material with antibacterial and antifungal activities according to claim 2.

19. An artificial leather consisting essentially of the film or sheet material with antibacterial and antifungal activities according to claim 2.

20. An adhesive or nonadhesive tape consisting essentially of the film or sheet material with antibacterial and antifungal activities according to claim 2.

21. A label or sticker consisting essentially of the film or sheet material with antibacterial and antifungal activities according to claim 2.

* * * * *